United States Patent
Fisher

[15] 3,635,359
[45] Jan. 18, 1972

[54] CONTROL MEANS FOR ROLLING RACK OF BALE WAGON

[72] Inventor: Raymond E. Fisher, Reedley, Calif.
[73] Assignee: Sperry Rand Corporation, New Holland, Pa.
[22] Filed: Mar. 31, 1970
[21] Appl. No.: 24,153

[52] U.S. Cl.................................................214/6 B, 214/82
[51] Int. Cl......................................................B65g 57/32
[58] Field of Search....................................214/6 B, 82, 83.22

[56] References Cited

UNITED STATES PATENTS

| 3,502,229 | 3/1970 | Butler | 214/6 B |
| 3,502,230 | 3/1970 | Grey et al. | 214/6 B |
| 3,401,810 | 9/1968 | Grey | 214/6 B |

Primary Examiner—Gerald M. Forlenza
Assistant Examiner—Robert J. Spar
Attorney—C. Hercus Just, Joseph A. Brown, John C. Thompson, James J. Kennedy and George C. Bower

[57] ABSTRACT

An agricultural bale wagon having a rolling rack which is movable rearwardly incident to tiers of bales being loaded onto the forward end of the load bed of the wagon, the rolling rack being movable in loading and unloading directions by a hydraulic cylinder unit which actuates a cable connected to the rolling rack and the hydraulic cylinder being controlled by a fluid circuit including certain control valves which are shiftable to permit movement of the rolling rack rearwardly when a new tier of bales is loaded onto the forward end of the load bed, but prevent rearward movement thereof immediately upon said new tier of bales being fully loaded onto said bed and the preceding load correspondingly having been shifted rearwardly.

5 Claims, 3 Drawing Figures

INVENTOR
RAYMOND E. FISHER

CONTROL MEANS FOR ROLLING RACK OF BALE WAGON

CROSS REFERENCES TO RELATED APPLICATIONS

The present invention essentially controls improvements over copending applications Ser. No. 755,141, now U.S. Pat. No. 3,502,230, filed Aug. 26, 1968 and Ser. No. 828,883, filed May 29, 1969 and both owned by the assignee of the present invention.

BACKGROUND OF THE INVENTION

The structure comprising the present invention essentially is an improvement over the structure of Ser. No. 828,883. Said pending application pertains to a bale wagon in which bales are loaded onto a first receiving table which sequentially moves two or more such bales, in end-to-end relationship, onto a second transfer table, where a tier of such bales is accumulated. When a full complement of such bales for said tier has been loaded upon the second transfer table, the latter is elevated from a somewhat horizontal position to a substantially vertical position to dispose the tier of bales either against a rolling rack upon the load bed of the wagon or against the forward face of a previously deposited tier of bales. All operation of the various receiving and transfer tables, rolling rack, and final unloading of the load bed is accomplished by hydraulic means and suitable fluid circuits and various control valves which are operated by appropriate cams, trip members, and various other appropriate means described in detail in both of said pending applications set forth above, in regard to which the present invention is an improvement.

One of the difficulties experienced in regard to operation of the invention comprising the subject matter of Ser. No. 828,883, in particular, is that when the load bed receives successive tiers of bales which are sequentially loaded upon the same from the forward end, the rolling rack which correspondingly moves rearward upon the load bed must permit movement of the entire load rearwardly each time a new tier of bales is deposited on the forward end of the load bed, but said loading rack must be restrained against rearward movement except when a newly formed tier of bales is to be deposited against the forward end of the accumulated load upon the load bed.

The mechanism, and especially the fluid circuit which controls the operation of the rolling rack in the structure comprising the subject matter of Ser. No. 828,883, includes a relief valve which normally maintains a limited amount of pressure within the system which restrains the rolling rack from rearward movement during the intervals of time between each elevating movement of a new tier of bales against the forward face of the load previously positioned upon the load bed. It can be appreciated that particularly when the bale wagon is partially loaded and as it progressively receives additional tiers of bales, the force imposed upon the rolling rack as the wagon rolls over a field, especially in view of the normally downward and rearward slope of the load bed which facilitates the loading of the bale wagon imposes a progressive increase in force upon the rolling rack which attempts to resist rearward movement of the load.

Under the foregoing circumstances, it has been found that the use of a relief valve in the fluid system to resist up to a predetermined amount of force is satisfactory especially when only a minor part of an entire load is imposed against the rolling rack. However, particularly when the wagon is nearly fully loaded, it has been found that primarily due to the jostling of the wagon and load over an uneven field, an undesired discharge of fluid through the relief valve occurs on such occasions and permits the rolling rack to be moved rearwardly inbetween the times when new tiers of bales are elevated by the transfer table onto the load bed. This disrupts the even loading of the wagon and even results in bales tumbling and otherwise being disarranged upon the wagon or dumped therefrom.

SUMMARY OF THE INVENTION

It is the principal purpose of the present invention to provide improved means in the hydraulic system which actuates and controls the movement of the rolling rack of an agricultural bale wagon of the type described above and in particular to provide positive means to lock the rolling rack against rearward movement except when the transfer table is being actuated to elevate a new tier of bales either initially against the rolling rack or subsequentially against the tier of bales last loaded upon the load bed, and also releasing the positive locking means when a new tier of bales is to be loaded onto the load bed.

It is another object of the invention to provide a lockout valve in the control system for the hydraulic cylinder which controls the movement of the rolling rack, said lockout valve being actuated in response to movements of the hydraulic means which move the transfer table in operative direction by which each new tier of bales is elevated to loaded position upon the load bed.

It is a further object of the invention to arrange such positive locking means for the rolling rack to operate in such manner that it will function as aforesaid to control the rearward movement of the rolling rack during loading operations but not interfere with the same during unloading operations for which the bale wagon also is adapted to be operated.

Still another object of the invention is to provide positive locking means for the rolling rack which are operable automatically, particularly during loading operations, without requiring further attention by an operator of the bale wagon and the loading means means therefor.

DESCRIPTION OF THE PREFERRED EMBODIMENTS

Figure 1:
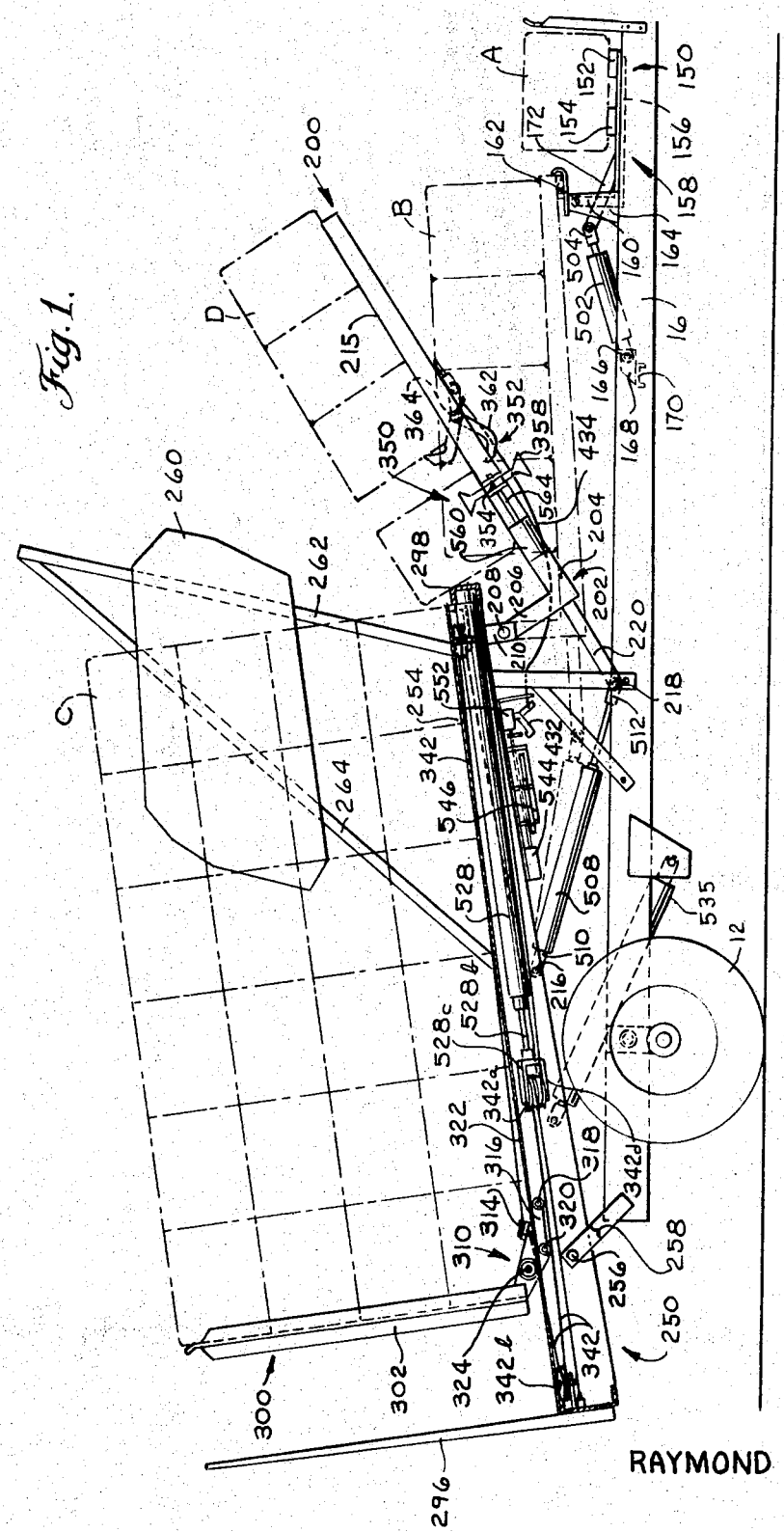
FIG. 1 is a side elevation of a bale wagon in which several different positions of the transfer table are shown respectively in full and broken lines to illustrate certain functions of the present invention.

Especially in view of the fact that the present invention primarily comprises an improvement over the subject matter of pending application Ser. No. 828,883, a description of the basic and essential features of the bale wagon structure covered by said pending application is set forth hereinafter to a sufficient extent that the advantages of the improvement comprising the present invention can be appreciated and understood. Further, certain details in particular of the hydraulic system by which the various elements of the bale wagon are activated and controlled are shown only diagrammatically. Operation of certain of these elements, and especially the control valves for the hydraulic cylinder units, is initiated by certain trip mechanisms, abutting means, cams and the like, details of which are not shown in the drawings of the present application but are illustrated and described primarily in copending application Ser. No. 755,141, now U.S. Pat. No. 3,502,230 to which attention is directed for a more complete description and illustration of the same.

Referring to the drawings and particularly FIG. 1, the bale wagon of this invention is provided with a chassis, indicated generally as 10, mounted on a pair of wheels, only the right wheel 12 being shown in FIG. 1. The chassis is formed of left and right longitudinally extending rails 16 of which only one rail is shown. Although it is not specifically shown, the forward ends of the longitudinally extending rails 16 converge in a clevis assembly which adapts the wagon to be secured to a tractor, or other towing vehicle, located at the front thereof. Power for the wagon is obtained from the tractor power takeoff in a conventional manner, but not specifically shown.

Mounted at the forward end of the chassis and extending transversely thereto is a first receiving table generally indicated by the numeral 150. The receiving table 150 comprises two transversely extending beams 152 and 154 which are mounted on a forwardly extending horizontal portion 156 of an L-shaped structure indicated generally at 158. The L-shaped structure includes a rear, upwardly extending leg portion 160 which is pivotally secured at 162 to spaced brackets 164, only one of which is shown, mounted on the right- and left-hand side rails 16. A hydraulic cylinder 502 is pivotally secured by means of a pivot pin 166 to the forwardly extending leg 168 which is mounted on a transverse frame member 170. The rod end 504 of the cylinder 502 is pivotally secured to an arm 172 which is welded, or otherwise secured, to the L-shaped member 158 of receiving table 150. As the cylinder 502 is extended, the receiving table 150 will be swung upwardly about its pivot point 162, thereby transferring any bales which have been accumulated on the table, for example, bale A, onto the second, or transfer table 200. The transferred bale A will assume the position shown at B in FIG. 1.

It will be understood by those skilled in the art, that the bales A are first introduced to receiving table 150 by means of a pickup, not shown, which lifts bales from the ground and directs them to the receiving table. The pickup means, well known in the art, is more fully disclosed and described in the U.S. Pat. to Grey et al. 3,300,424, issued July 11, 1967.

The transfer table 200 is also mounted on a pair of L-shaped structures 202, only one being shown, each having a forwardly extending leg portion 204 and an upwardly extending rear leg portion 206 which is disposed at right angles to the lower leg portion 204. Each of the upwardly extending leg portions 206 are secured by pivot pin 208 to a depending lug 210 mounted on the forward end portion 252 of load bed 250. A bed surface 215 of the transfer table 200 is formed across the legs 204 and provides a surface upon which bale tiers are formed. When the transfer table 200 is in its normal tier forming position, it is disposed in the position shown by the dot-dash lines shown in FIG. 1. When the requisite number of bales B have been accumulated on table 200, to form a tier of bales thereon, a hydraulic cylinder 508 is actuated, by trip means, not shown, so that it extends and causes the table 200 to swing upwardly about its pivot point 208. In this manner, the bale tier formed on the transfer table is transferred to a rearwardly disposed load bed, or load table 250. Anchor end 510 of cylinder 508 is secured by means of a pivot pin 216 to the load carrying bed 250. The rod end 512 of cylinder 508 is pivotally connected by means of a pivot pin 218 to a rearwardly extending member 220, which is fixed by its forward end to the rear portion of the L-shaped structure 202.

The load table, or load carrying bed 250, includes a platform assembly 254 which is mounted about a pair of transversely rearwardly disposed pivot pins 256. The pivot pins are supported on upwardly and rearwardly extending brackets 258 which are secured to the rear end of the longitudinally extending frame members 16. As the stack is formed on load bed 250, the second table 200 is swung upwardly to deposit its tier of bales B upon the load bed, whereupon the bales B assume the position shown at C in FIG. 1. As the first bale tier is deposited on the bed, a rolling rack 300 is contacted by the bales and forced rearwardly. Successive tiers of bales placed on the load bed will cause a continued rearward movement of the rack. The bale tiers are laterally confined by right- and left-hand side shields 260, only the right-hand side shield being shown in FIG. 1. Each of the side shields 260 is supported by upwardly extending front and rear struts 262 and 264, respectively.

A plurality of upwardly extending forks 296 are mounted at the rear of the platform assembly 254. These forks 296 are mounted in fixed spaced apart relation and limit the rearward movement of the rolling rack.

Figure 2:
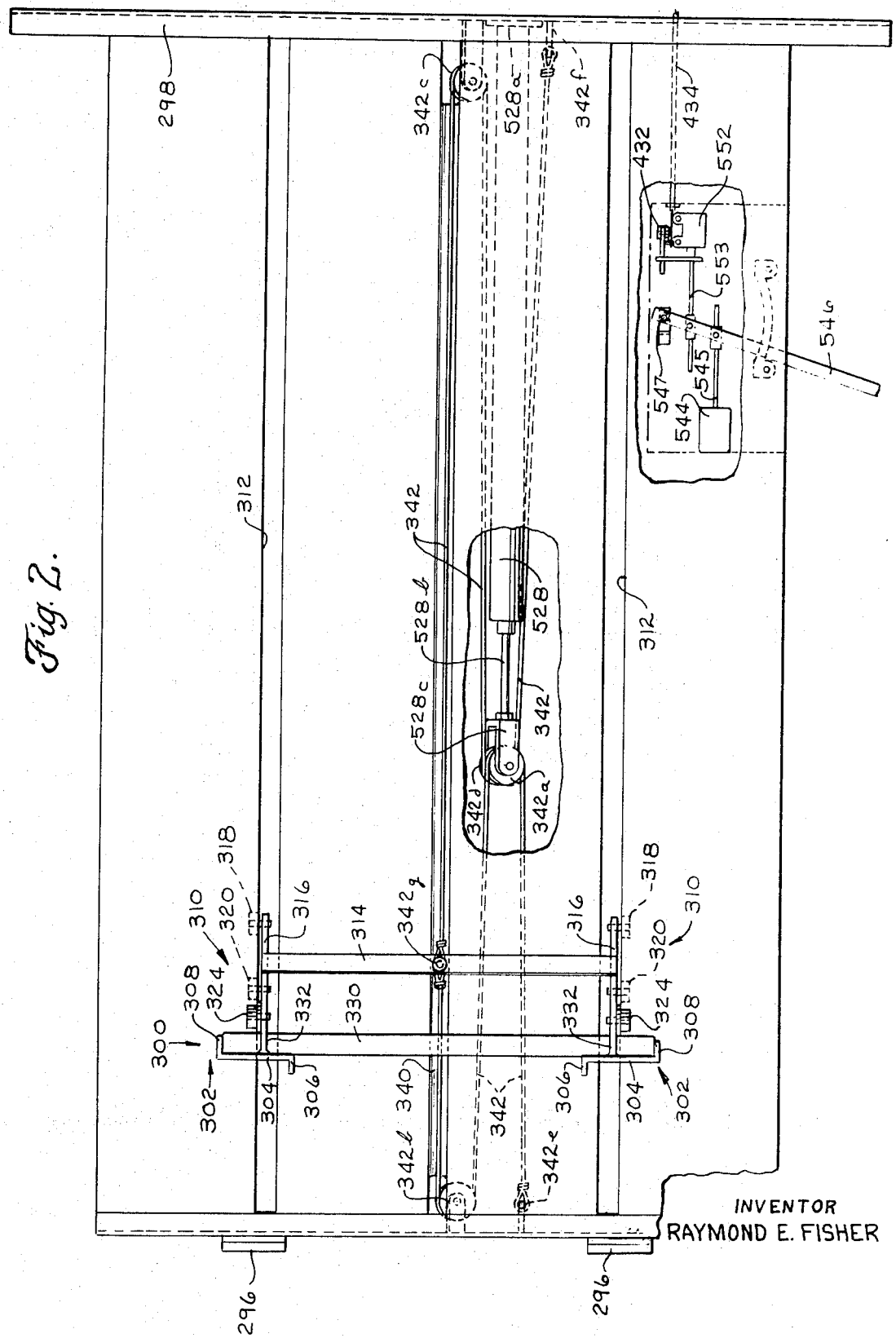
FIG. 2 is a plan view of the load bed of the bale wagon shown in FIG. 1, portions of the bed being cut away to illustrate certain details of the cable and cylinder of the actuating means.

The rolling rack 300 is mounted on the platform assembly 254 of the load carrying bed 250 and is adapted to support a stack of bales in a manner best shown in FIG. 1. The rolling rack comprises two spaced-apart forks 302, as shown in FIG. 2, which are mounted for movement in a fore-and-aft direction along platform 254. Each fork 302 includes a transversely extending web portion 304, a rearwardly extending inner aligning portion 306 and a forwardly extending outer portion 308 which is adapted to dig into the bales loaded against the fork and provide lateral stability therefor. A pair of trolley assemblies 310 are adapted to carry the forks 302 for movement along platform 254. Each trolley assembly 310 is adapted to run in a groove 312 formed in the platform assembly as shown in FIG. 2. A member 314, extending transversely to the grooves 312, connects each of the trolley assemblies, as shown in the drawings.

Each assembly 310 includes a longitudinally extending member 316 which is welded or otherwise fixed to an end of transverse member 314. Front and rear lower rollers 318 and 320, respectively, are mounted on the member 316 in a conventional fashion, said rollers being adapted to contact the lower surface 322 of the platform assembly 254 adjacent the fore-and-aft extending grooves 312. An upper rear roller 324 is also mounted on member 316, and is adapted to contact the upper surface 326 of the platform assembly 254. With this construction, it will be evident that member 316 may move only in a fore-and-aft direction, since its vertical movement is limited by rollers 318, 320 and 324, and the transverse movement of the member 316 is limited by member 314 and the outer edge of groove 312.

Each of the forks 302 is welded to a transversely extending member 320 which is triangular in cross section, the outer flange 308 being welded to the end of member 330. A pair of forwardly extending mounting brackets 332 are welded at their rearward ends to the triangular frame member 330 and pivotally secured by the forward ends to the members 316, by means not shown.

The rolling rack is adapted to be advanced forwardly and rearwardly by means of a cable 342 which is connected to the rolling rack between the bed means 250 and a hydraulic cylinder 528. During the loading operation, as tiers of bales are loaded onto the load bed, fluid is displaced from the cylinder 528 and is directed back to a reservoir 514 to permit the rack to be moved rearwardly as the tiers of bales are loaded onto the forward portion of the bed. The cylinder also may be positively controlled for forward movement of the rolling rack as will be described in detail hereinafter.

When the operator of the bale wagon desires to unload his wagon one bale at a time, the bale tiers C are moved from the bale carrying bed 250 back onto the inclined transfer table 200, where a cross conveyor 350 engages the end bale of the lowest layer of bales and shifts the bales to the right for discharge. A bale engaging means 352 has previously engaged the layers of bales above the lowermost layer of bales and shifts the bales to the right for discharge. A bale engaging means 352 has previously engaged the layers of bales above the lowermost layer to be discharged, as illustrated in FIG. 1, and shifted them upwardly on the bed surface 215. The cross conveyor, in part, comprises a conveyor chain 354 having a pair of paddles 358 mounted thereon. The paddles 358 are adapted to contact the left-hand end of the bale layers and shift them to the right for discharge, directed toward the observer as viewed in FIG. 1.

The bale engaging hooks 352 are controlled by the conveyor 350 so that they will assume a first operative mode in the up position, or bale engaging position, separating the upper bales from the lower layer of bales and a second operative mode, or retracted position. The operation is more fully described in the aforementioned application Ser. No. 755,141, now U.S. Pat. No. 3,502,230. When the transfer table 200 is in its inclined, or single bale unloading position, as shown in FIG. 1, the bales disposed above the discharged layer will shift downwardly as the bale hooks are retracted until they engage box beam 298, mounted at the forward edge of load bed 250. The box beam member extends laterally outwardly of each side of the platform assembly, as shown in FIG. 2, to provide additional support for the bales being discharged.

The bale engaging means 352 comprises a plurality of hooks 362 which are secured to a rotatable rock shaft 364. Shaft 364 is journaled beneath the surface of transfer bed 200 by means not shown. The bale hooks 362, of which one is shown, are adapted to pivot upwardly through apertures, not shown, in the surface of transfer bed 200 to engage bales, as shown by the dot-dash lines in FIG. 1. The bale hooks have a first operative mode, or position, wherein they extend upwardly through the table and engage the upper
bales of a tier separating the upper bales from the lower bales as shown. The second operative mode, or position, is a retracted position shown by the solid lines in FIG. 1.

As tiers of bales are formed on the transfer bed 200 and are lifted upwardly by the transfer bed 200 to load bed 250, they will first contact rolling rack 300 and force it rearwardly. The movement of the rolling rack is controlled by cylinder 528, the rack being interconnected to the cylinder by means of a cable 342. One end 342e of the cable 342 is connected to the rear end of platform assembly 354, with intermediate portions of the cable being disposed over the first, second, third, and fourth sheaves 342a, 342b, 342c, and 342d, respectively, and the opposite end being fixed to the forward end of the platform assembly at 342f. A pulley mounting bracket 528c is disposed at the end of cylinder rod 528b, as shown in FIG. 2.

Sheaves 342a and 342d are rotatably mounted in side-by-side relation in bracket 528c, while sheave 342b is mounted at the rear end of platform assembly 254 and sheave 342c is mounted at the forward end of the platform assembly. The cylinder 528 is fixedly connected to the forward end of the platform assembly 254 at its anchor end 528a. An intermediate portion of the cable 342, between sheaves 342b and 342c, is fixedly secured to the transverse frame member 314, as shown in FIG. 2 are 342g. As the tiers of bales are loaded onto the load bed, the rolling rack will be shifted rearwardly. When the load bed is fully loaded, the forks 302 will overlie the forks 296 mounted on the platform assembly 254, with the rearwardly extending flange portion 306 being disposed to the inside of forks 296.

When a single bale unloading operation is desirable, it is first necessary to position the transfer table 200 in its inclined single bale unloading position shown by the solid lines in FIG. 1. This is done in a conventional manner by actuating cylinder 208. Once the second table has been positioned in its inclined relation to the bale wagon chassis structure, it is necessary to advance the rolling rack 300 to deposit a tier of bales on the second table 200. This is accomplished by extending the rolling rack cylinder 528 which will cause the mid portion of cable 342 to move forwardly.

The cylinder 528 is controlled through a control lever 546 and various control valves 544 and 552. When the control lever 546 is shifted all the way to the rear which is indicated position 1 in FIG. 3, the spools and valves 544 and 552 will likewise be shifted to the rear causing fluid under pressure to flow from the control valve 544 through line 554 and valve 552 into line 556. As the rolling rack is advanced, the foremost tier of the bale stack will pass over a channel member 298 at the forward end of assembly 254 and fall onto the second table 200 assuming the position shown at D.

Figure 3:
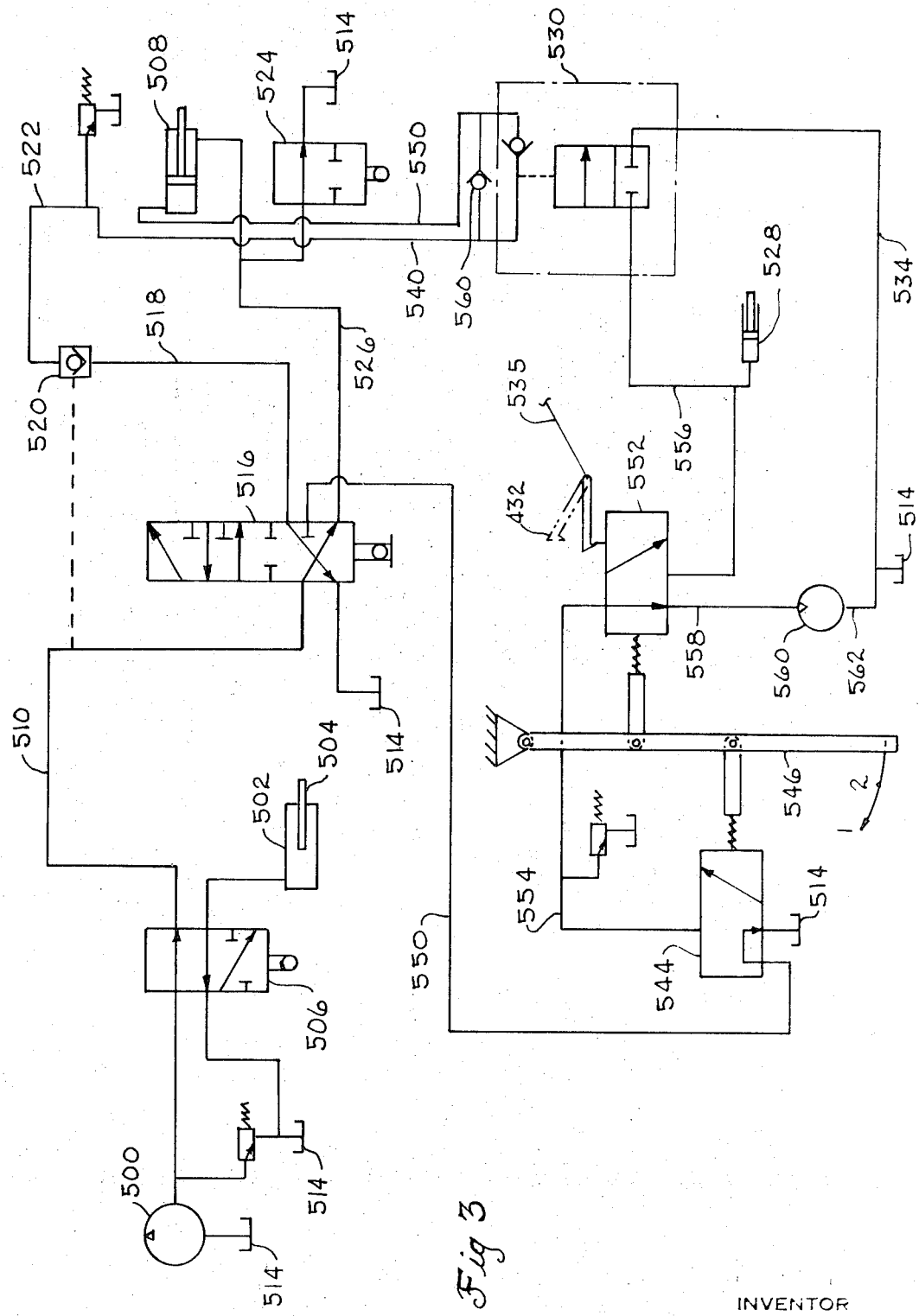
FIG. 3 is a schematic view of the various hydraulic components and hydraulic circuitry necessary for operation of the receiving table, transfer table, load bed and rolling rack of the invention.

After the bale tier has fallen onto the transfer table 200, the rolling rack is stopped and a motor 560, which drives the cross conveyor 350 is started. This is accomplished by shifting lever 546 to an intermediate rear position indicated position 2 in FIG. 3, so that the spool within valve 552 is shifted to its normal forward position, as shown in FIG. 3, while the spool within valve 544 is maintained in its rearward position. Fluid now flows from line 554 through valve 552 into line 558 and then to rotary hydraulic motor 560. Oil is discharged from motor 560 through line 562 into reservoir 514. The motor 560 has an output shaft 564 which is connected in driving relationship to a sprocket, not shown, over which the conveyor chain rides. Rotation of the cross conveyor will result in actuation of the bale engaging means 352 and with the paddles 358 engaging the bales and discharging them from the wagon.

HYDRAULIC SYSTEM

As the bale wagon of this invention is propelled forwardly over a field, it will pick up bales laying upon the ground by means, not shown, and, as indicated above, lift them upwardly initially to a position indicated at A in FIG. 1. The first bale will be conveyed toward the observer, as seen in FIG. 1, by the conveyor chain indicated at 358, and when a second bale is picked up and loaded onto the first table, the first bale will contact a trip lever, not shown, but described in Ser. No. 755,141, and the second bale will contact a second trip lever 176, likewise not shown herein, causing the valve 506 to shift from its normal position shown in FIG. 3 to that position where fluid will be directed from pump 500 into the first table cylinder 502 and thereby cause the cylinder to extend and force the table upwardly to shift the layer of bales onto the forward edge of the second table. As the table 150 attains its fully raised position, the valve 506 is shifted back to its normal position by a trip mechanism not material to the present invention, and the table will then fall to its lowered position, forcing the fluid trapped within the cylinder 502 through the valve 506 back to the fluid reservoir 514.

As additional pairs of bales are picked up they will be formed into a row on the first table and transferred to the second table until four rows have been accumulated upon the second table. At this point the rearward layer of bales on the table will contact a trip lever, not shown, but described in Ser. No. 755,141, now U.S. Pat. No. 3,502,230 and move it back to a latched position, the second table valve 516 then also shifting from its normal position, shown in FIG. 3, through an intermediate valve position to that position where the fluid is directed through line 518, pilot operated check valve or lock out valve 520, and lines 522, 540, 550 to the anchor end of the second table cylinder 508. As the second table cylinder is extended it will raise the table 200.

As the second table 200 swings upwardly due to the extension of the cylinder 508, the selector valve 524 will be shifted from the normal position shown in FIG. 3 to its other position, causing displaced oil from the cylinder 508 to flow through line 526 and second table control valve 516 back into reservoir 514. As the table 200 attains its fully raised position it will set the tier of bales formed on the second table on the forward end of the load rack or bed as represented by the broken line bales C in FIG. 1. When this occurs, the spool within the second table control valve 516 will be shifted, causing the flow of fluid within lines 518 and 526 to be reversed, the fluid initially entering the rod end of the cylinder 508 and being discharged through the line 522, lock out valve 520, line 518, and valve 516 back to the reservoir 514.

After the table has descended partially, cam mechanism, not shown, will shift the valve 524 back to its normal position shown in FIG. 3 at which time flow from the pump 500 through the valve 516 will return to reservoir 514 through valve 524. However, the weight of the second table will continue to force the cylinder assembly 508 into its retracted position displacing the fluid from the anchor end of the cylinder through lines 522 and 518 into the reservoir. It should be noted that during this stage of the operation, if pressure should fail within the system, lockout valve 520 will prevent the table from descending any further.

As the tiers of bales are placed upon the load bed they will contact the rolling rack 300 and force it rearwardly. As previously described, the movement of the rolling rack is controlled by cylinder 528, the rack being interconnected with the cylinder by means of a cable 342 which extends around various sheaves described above. An intermediate portion of the cable between sheaves 342b and 342c is fixedly secured to the transverse frame member 314. As the tiers of bales are loaded onto the load bed the rolling rack will be shifted rearwardly.

During this operation, the principal purpose of the present invention is to provide means to prevent rearward movement of the rolling rack 300, except when the second table 200 is being elevated by cylinder 508. This is accomplished by including a lockout valve 530 in the system which functions as follows:

In the normal holding position of the rolling rack 300, it is maintained against movement rearwardly by cylinder 528. To accomplish this, fluid is maintained within the anchor end of the cylinder 528. This is accomplished by means of a lockout valve 530, and fluid can only be discharged from the cylinder 528 when there is fluid flow through the valve 530. When there is no fluid flow to or from the cylinder 508 there is no fluid flow to the lockout valve circuit 540, 550, and thus fluid cannot be discharged from the cylinder 528.

Fluid flows through the lockout valve 530 only when the cylinder 508 is being extended to transfer bales from the second table 200 to the load bed 250. Thus, when the load bed 250 is being loaded and a full complement of bales have been loaded onto the transfer table 200, trip mechanism, not shown but described in detail in Ser. No. 755,141, is operated to shift control valve 516 from its normal position (shown in FIG. 3) to a position wherein pressure from line 510 is delivered to line 518 to the anchor end of the cylinder 508 to elevate the transfer table 200. At this time, line pressure exists in line 522 and is transferred by line 540 to lockout valve 530 to open it and to permit the fluid to discharge from the anchor end of the cylinder 528 and to pass through the line 556, lockout valve 530, and from there by means of line 534 to reservoir 514. This arrangement continues until transfer table 200 has moved a new tier of bales tight up against the load or rolling rack 300 at which time valve 516 is again shifted to direct line pressure from pump 500 to line 510 to line 526 for application against the rod end of cylinder 508 to lower table 200 causing the flow of fluid in the line 550 to be reversed. Fluid from the anchor end of cylinder 508 now flows through line 550, check valve 560 (bypassing lockout valve 530), lines 540, 522 and 518, and control valve 516 to reservoir 514. Thus, the lockout valve 530 is closed to restore to a holding function for the rolling rack 300.

From the foregoing, it will be seen that the bale wagon comprising the present invention is capable of being loaded with bales successively by the same being received upon the receiving table 150, moved by the same onto the transfer table 200 where a tier of the same has been accumulated, said tier is successively being moved by transfer table 200 to a vertical position against the rolling rack 300 or the front face of the forwardmost tier previously deposited upon the load bed, and when a complete load has been deposited upon the load bed such a stack may be unloaded by transferring the same successively to the transfer table from which they are individually deposited upon the ground as the bale wagon moves along, such as where stock is being fed and the like. Especially for details of the unloading function, attention is directed to said pending application Ser. No. 755,141, now U.S. Pat. No. 3,502,238.

While the foregoing invention has been described in conjunction with a bale wagon employing a single acting cylinder to advance the rolling rack, it should be noted that in another embodiment of this invention a double acting cylinder is employed to move the rolling rack forwardly and rearwardly. In this embodiment the discharge from the anchor end of the double-acting cylinder is controlled by substantially the same means set forth above.

It is to be understood that the invention is not limited to the particular details, shown and described above, but that, in fact, widely different means may be employed in the practice of the broader aspects of the invention.

Having thus described my invention, what I claim is:

1. A bale wagon adapted to be moved over a field to pick up bales and stack then in successive vertical layers upon the bed of the wagon and unload the same therefrom comprising in combination, means to arrange a plurality of bales in a tier, means to elevate said tier into substantially vertical position at the forward end of said bed against a rolling rack carried by the bed of said wagon, means supporting said rolling rack substantially perpendicularly relative to said bed, and a first hydraulic cylinder unit adapted to permit movement of said rolling rack rearwardly toward the rear end of said bed of said wagon as successive tiers of bales are elevated onto said forward end of said bed, in combination with a lockout valve connected by hydraulic circuitry with said first hydraulic cylinder unit and operable to lock said rolling rack against rearward movement upon said bed except when a tier of bales is being elevated onto said bed and thereby permit the previously loaded tiers to move rearwardly upon said bed to accommodate another tier of bales at the forward end of said bed while supporting said loaded tiers against movement beyond the rear end of said bed, and a second hydraulic cylinder unit operable to elevate tiers of bales upon the bed of the wagon, a fluid circuit to and from said second cylinder unit, said circuit being interconnected to the circuit of said lockout valve and fluid from the circuit of said second hydraulic cylinder being adapted to move said lockout valve to open position by pressure in said fluid circuit when elevating a tier of bales and thereby permit rearward movement of said rolling rack.

2. The bale wagon according to claim 1 in which said first hydraulic cylinder unit comprises a piston movable in opposite directions and wherein the movement in one direction permits rearward movement of said rolling rack and said lockout valve being included in the fluid line from the discharging end of said cylinder which permits said rearward movement, whereby when said rolling rack is to be locked against rearward movement said lockout valve is closed to prevent discharge of fluid from said end of said cylinder.

3. The bale wagon according to claim 1 further including means to close said lockout valve to lock said rolling rack against rearward movement substantially at the conclusion of elevation of a tier of bales upon the bed of the wagon.

4. The bale wagon according to claim 1 further including a fluid reservoir in the hydraulic system, said reservoir being connected in the fluid circuitry and operable when the cylinder which operates the rolling rack is conditioned to permit the rolling rack to move rearwardly to discharge fluid from one end of said cylinder which actuates said rolling rack and pass it through the lockout valve to said reservoir.

5. The bale wagon according to claim 4 further including a check valve in the line to said lockout valve from said second cylinder unit and operable to permit movement of fluid past said lockout valve when said valve is closed and thereby discharge fluid to said reservoir.

* * * * *